US011233796B2

(12) United States Patent
Li et al.

(10) Patent No.: US 11,233,796 B2
(45) Date of Patent: Jan. 25, 2022

(54) DATA-DRIVEN ATTRIBUTE SELECTION FOR USER APPLICATION ENTITLEMENT ANALYSIS

(71) Applicant: EMC IP Holding Company LLC, Hopkinton, MA (US)

(72) Inventors: Zhou Li, Malden, MA (US); Alex Zaslavsky, Brookline, MA (US); Kevin Bowers, Melrose, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 539 days.

(21) Appl. No.: 16/146,196

(22) Filed: Sep. 28, 2018

(65) Prior Publication Data
US 2020/0106781 A1     Apr. 2, 2020

(51) Int. Cl.
*H04L 29/06* (2006.01)
*G06F 21/62* (2013.01)
(Continued)

(52) U.S. Cl.
CPC ........... *H04L 63/102* (2013.01); *G06F 17/15* (2013.01); *G06F 21/604* (2013.01);
(Continued)

(58) Field of Classification Search
CPC ... H04L 63/102; H04L 63/104; G06F 21/629; G06F 17/15; G06F 21/604; G06F 2221/2141
See application file for complete search history.

(56) References Cited

U.S. PATENT DOCUMENTS 10,114,884 B1 * 10/2018 Valensi ................. G06F 16/285
10,296,520 B1 *  5/2019 Ganesh ................. G06F 16/285
(Continued)

OTHER PUBLICATIONS

Madhan Kumar Srinivasan et al., "Analysis on identity management systems with extended state-of-the-art IDM taxonomy factors," IJASUC, vol. 1, No. 4, Dec. 2010, pp. 62-70. (Year: 2010).*
(Continued)

*Primary Examiner* — Luu T Pham
*Assistant Examiner* — Canh Le
(74) *Attorney, Agent, or Firm* — Ryan, Mason & Lewis, LLP

(57) ABSTRACT

Techniques are provided for selecting attributes to cluster users for a user application entitlement evaluation. An exemplary method comprises obtaining enterprise reference data indicating a plurality of attributes for a plurality of enterprise users; obtaining enterprise entitlement data indicating user application entitlements for the plurality of enterprise users; selecting at least one of the plurality of attributes as a cluster attribute using predefined information content rules applied on the enterprise entitlement data; determining a probability of a user application entitlement for the one or more user application entitlements based on a number of users for a plurality of values of the cluster attribute and a number of users for a plurality of pairs of the cluster attribute and a value of the one or more user application entitlements; and identifying anomalies in the enterprise entitlement data based on the probability of the user application entitlement for at least one user application entitlement and at least one predefined anomaly threshold.

20 Claims, 8 Drawing Sheets

(51) Int. Cl.
*G06F 17/15* (2006.01)
*G06F 21/60* (2013.01)

(52) U.S. Cl.
CPC .......... *G06F 21/629* (2013.01); *H04L 63/104*
(2013.01); *G06F 2221/2141* (2013.01)

(56) References Cited

U.S. PATENT DOCUMENTS

| | | | | |
|---|---|---|---|---|
| 10,803,050 | B1* | 10/2020 | Salkola | G10L 15/1815 |
| 2004/0103199 | A1* | 5/2004 | Chao | G06F 16/9574 709/228 |
| 2008/0052102 | A1* | 2/2008 | Taneja | G06Q 10/103 705/7.11 |
| 2009/0150981 | A1* | 6/2009 | Amies | H04L 67/02 726/5 |
| 2011/0307957 | A1* | 12/2011 | Barcelo | G06F 21/577 726/25 |
| 2012/0025997 | A1* | 2/2012 | Liu | E21B 47/009 340/679 |
| 2012/0079556 | A1* | 3/2012 | Wahl | G06F 21/604 726/1 |
| 2012/0102489 | A1* | 4/2012 | Staiman | G06Q 10/0631 718/1 |
| 2014/0359695 | A1* | 12/2014 | Chari | G06F 21/31 726/1 |
| 2015/0067889 | A1* | 3/2015 | Baikalov | G06F 21/577 726/28 |
| 2015/0082377 | A1* | 3/2015 | Chari | H04L 63/20 726/1 |
| 2016/0112973 | A1* | 4/2016 | Wang | H04W 56/001 455/429 |
| 2017/0185668 | A1* | 6/2017 | Convertino | G06F 17/18 |
| 2019/0149854 | A1* | 5/2019 | Manning | H04N 21/25866 725/34 |
| 2019/0370696 | A1* | 12/2019 | Ezen Can | G06N 20/00 |

OTHER PUBLICATIONS

Rupak Chattopadhyay, "Politics and Economics: Extending Entitlement Analysis," Sep. 1996, pp. 1-78. (Year: 1996).*
T. Das, R. Bhagwan, and P. Naldurg, "Baaz: a system for detecting access control misconfigurations," in Proc. of the 19th USENIX Conference on Security. USENIX Association, 2010.
Attestation and Recertification, 5 Things to Know, Controlling Permissions, https://oxfordcomputergroup.com/resources/attentation-five-things-to-know/, 2018.
Robert Doswell, From Role-Based Access Control to Access Governance, CTOvision.com, Mar. 31, 2016.
IBM Knowledge Center, Managing Application Entitlements (by Application Owner), https://www.IBM.com/support/knowledgecenter/en/SSCT62/com.ibm.iamservice.doc/tasks/t_application_manage_access.html, 2018.
Oracle Identity Manager Tools Reference Release 9.1.0.2, Using Entitlement Data, https://docs.oracle.com/cd/E14899_01/doc.9102/e14763/entitlement.htm, 2009.
Gery Menegaz, Enterprise Entitlements Management: Moving Beyond Authentication, for Between the Lines, Jun. 7, 2012, https://www.zdnet.com/article/enterprise-entitlements-management-moving-beyond-authentication/.
Oracle, The Entitlements Problem, Introduction to Oracle Entitlements Server, https://docs.oracle.com/cd/E12890_01/ales/docs32/secintro/entitlements.html, 2016.
Gartner, IT Glossary (/it-glossary/), Entitlement Management, www.gartner.com, 2018.

* cited by examiner

DATA-DRIVEN ATTRIBUTE SELECTION FOR USER APPLICATION ENTITLEMENT ANALYSIS

FIELD

The field relates generally to the evaluation of user authorizations or other types of entitlements to access resources in an information processing system.

BACKGROUND

Access Governance controls the management of user authorizations and/or entitlements to access resources in an enterprise system, such as applications. User authorizations and/or entitlements may include optional rights or privileges that have been selectively assigned to various personnel (e.g., employees and contractors) with the approval of a manager (for example). In a role-based access control model, for example, user permissions to perform certain tasks can be assigned to specific user roles.

As enterprises evolve, for example, due to corporate reorganizations and other changes in personnel (and their respective roles), as well as to changes in enterprise resources, the user authorizations and/or entitlements must be reevaluated. Recertification or attestation is the process of validating the Access Governance models and the user authorizations and/or entitlements for such users to use various enterprise resources. Generally, a certification process determines whether the authorizations held by individual users, for example, on the basis of their attributes (e.g., roles), remain valid within a given enterprise.

A business unit (or group) may be asked, for example, to validate the employees currently within the business unit and whether such personnel should continue to maintain their respective user authorizations. During this attestation process, a manager may receive a list of the user entitlements of the users within his or her group, and the manager must decide whether the entitlement is appropriate for the user role or if the entitlement poses a risk for the enterprise. As the number of applications used by each user grows, together with the associated number of user entitlements, it becomes increasingly challenging for the manager to manually review the list of entitlements. As a result, a manager may approve the entitlements without really understanding the potential risk.

A need therefore exists for automated techniques for selecting user attributes to aid in the entitlement attestation analysis.

SUMMARY

In one embodiment, a method comprises obtaining enterprise reference data indicating a plurality of attributes for a plurality of enterprise users; obtaining enterprise entitlement data indicating one or more user application entitlements for the plurality of enterprise users; selecting at least one of the plurality of attributes as a cluster attribute using one or more predefined information content rules applied on the enterprise entitlement data; determining a probability of a user application entitlement for the one or more user application entitlements based on a number of users for a plurality of values of the cluster attribute and a number of users for a plurality of pairs of the cluster attribute and a value of the one or more user application entitlements; and identifying one or more anomalies in the enterprise entitlement data based on the probability of the user application entitlement for at least one user application entitlement and at least one predefined anomaly threshold.

In various embodiments, the predefined information content rules comprise (i) an entropy test that removes a given attribute below a predefined entropy value; (ii) a unique values test that removes a given attribute below a predefined cardinality value or a given attribute having a relative cardinality value above a predefined threshold; (iii) a distribution test that removes a given attribute having a percent of users in each element of the given attribute above a predefined value or a given attribute having a number of users in each element of the given attribute below a predefined value; and/or (iv) a cross correlation test that determines a cross correlation for a pair of attributes and removes a given attribute having a lower cardinality from the pair of attributes when the cross correlation for the pair of attributes is above a predefined correlation threshold.

Other illustrative embodiments include, without limitation, apparatus, systems, methods and computer program products comprising processor-readable storage media.

DETAILED DESCRIPTION

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods, apparatus and computer program products for selecting attributes to cluster users for a user application entitlement evaluation.

One or more embodiments of the disclosure enable a manager to make informed decisions about user application entitlements during an attestation review. One or more aspects of the disclosure recognize that decision making tasks within an attestation review process require context about the entitlement. The context may be provided, for example, by identifying anomalies in the enterprise entitlement data using machine learning and/or statistics techniques. For example, a given user application entitlement should be identified as potentially anomalous if, among all users in a specific location or group (or another user cluster), a given employee is the only employee that has the given user application entitlement. A manager or another steward can use the provided context to prioritize the list of user application entitlements to be reviewed and to provide an explanation (context) as to why the given user application entitlement is unnecessary, suspicious or might pose a risk to the organization.

In some embodiments, a set of keys or user attributes within enterprise reference data is used to cluster users. For example, users can be clustered on the basis of location, title, manager, organization, department, or a combination of the foregoing. Generally, users having the same attributes should have similar entitlements. Thereafter, anomalies are identified in the clustered key(s).

Figure 6:
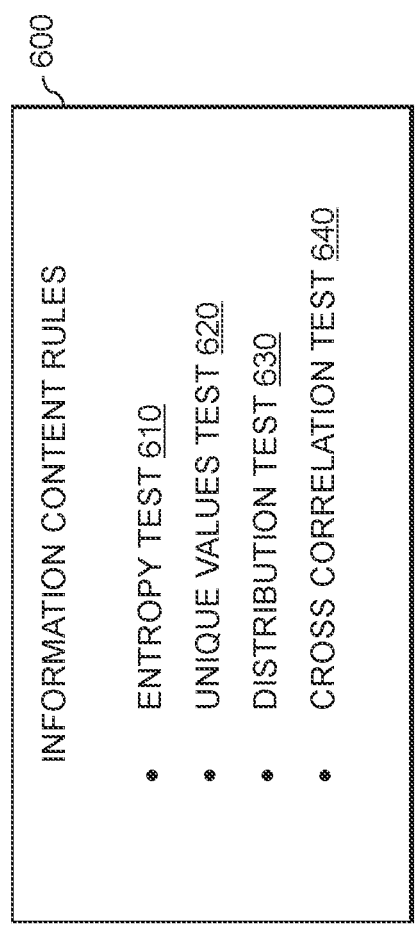
FIG. 6 illustrates an exemplary set of information content rules used by the user application entitlement evaluation process of FIG. 3 for selecting user attributes to use for the attestation analysis, according to some embodiments.

In one or more embodiments, a set of information content rules, as discussed further below in conjunction with FIG. 6, are applied to the available keys or attributes to prevent keys or attributes that are not sufficiently informative from being used to cluster users. Generally, some attributes are customized, for example, without a meaningful name, and do not provide enough information to form the basis for a cluster. Similarly, some attributes should be barred whether or not they can be used for clustering, such as a gender attribute. In the exemplary embodiment of FIG. 6, the information content rules employ an entropy test, a unique values test, a distribution test, and/or a cross correlation test, each discussed further below.

In at least one embodiment, an automated response is triggered based on a detected anomaly. For example, the automated response may comprise generating a report providing a context of the detected anomaly (for example, for review by a manager performing an attestation involving the detected anomaly), and/or generating an alert regarding the detected anomaly.

Figure 1:
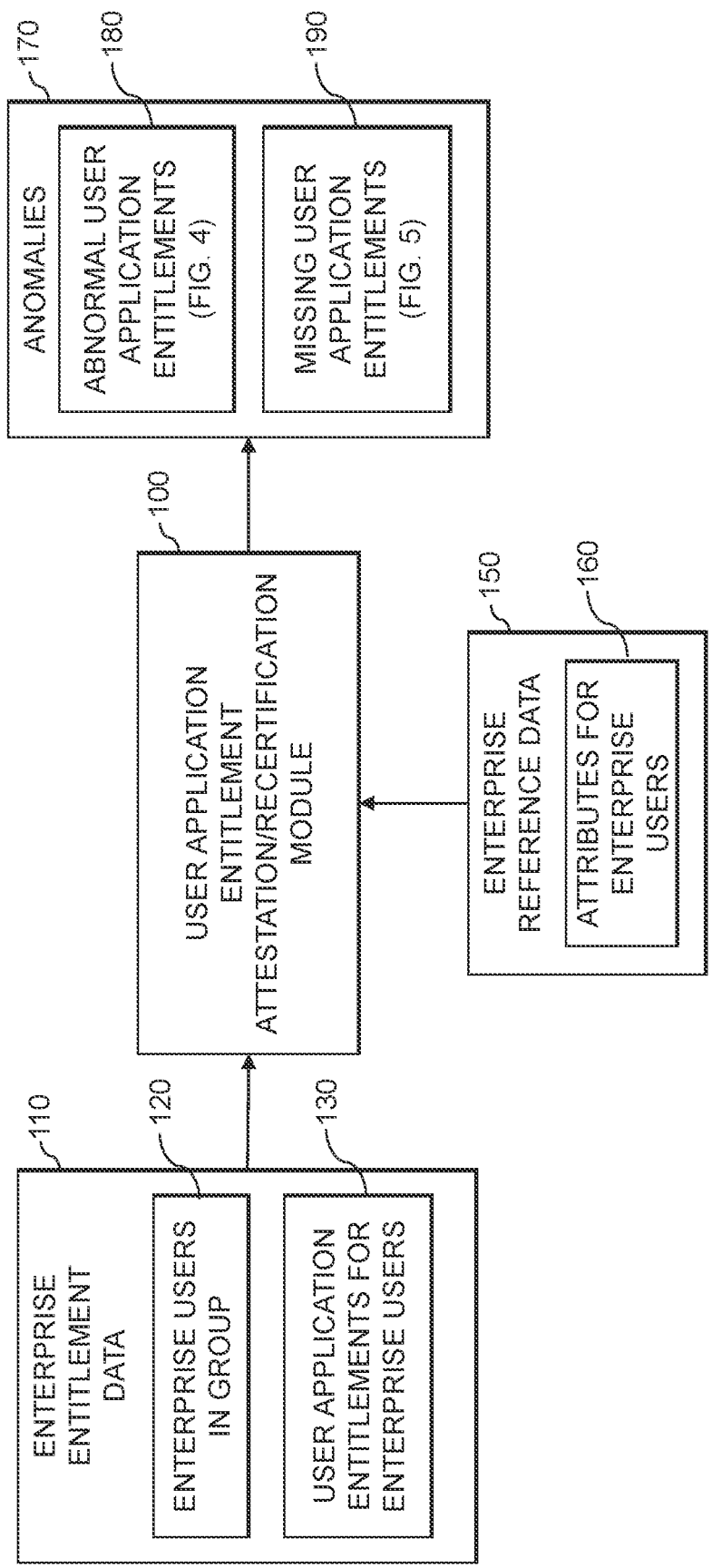
FIG. 1 illustrates a user application entitlement attestation/recertification module, according to one embodiment of the invention.

FIG. 1 illustrates a user application entitlement attestation/recertification module 100, according to one embodiment of the invention. As shown in FIG. 1, the exemplary user application entitlement attestation/recertification module 100 processes enterprise entitlement data 110 and enterprise reference data 150, and generates one or more anomalies 170.

The exemplary enterprise entitlement data 110 comprises a list of the enterprise users 120 in a particular group, and user application entitlements 130 for the enterprise users in the group. In addition, the exemplary enterprise reference data 150 comprises attributes 160 for the enterprise users. For example, the attributes 160 may include location, title, manager, organization, department, or a combination of the foregoing.

The exemplary anomalies 170 comprise one or more abnormal user application entitlements 180 (as discussed further below in conjunction with FIG. 4) and one or more missing user application entitlements 190 (as discussed further below in conjunction with FIG. 5).

Generally, as discussed further below, the exemplary information content rules of FIG. 6 are applied to the available attributes 160 in the enterprise reference data 150 to remove attributes that are not sufficiently informative for clustering users. One or more of the surviving attributes 160, following the application of the information content rules, are used to cluster the enterprise users 120 in the particular group. Thereafter, anomalies are identified in the clustered data, such as one or more abnormal user application entitlements 180 and/or missing user application entitlements 190.

Figure 2:
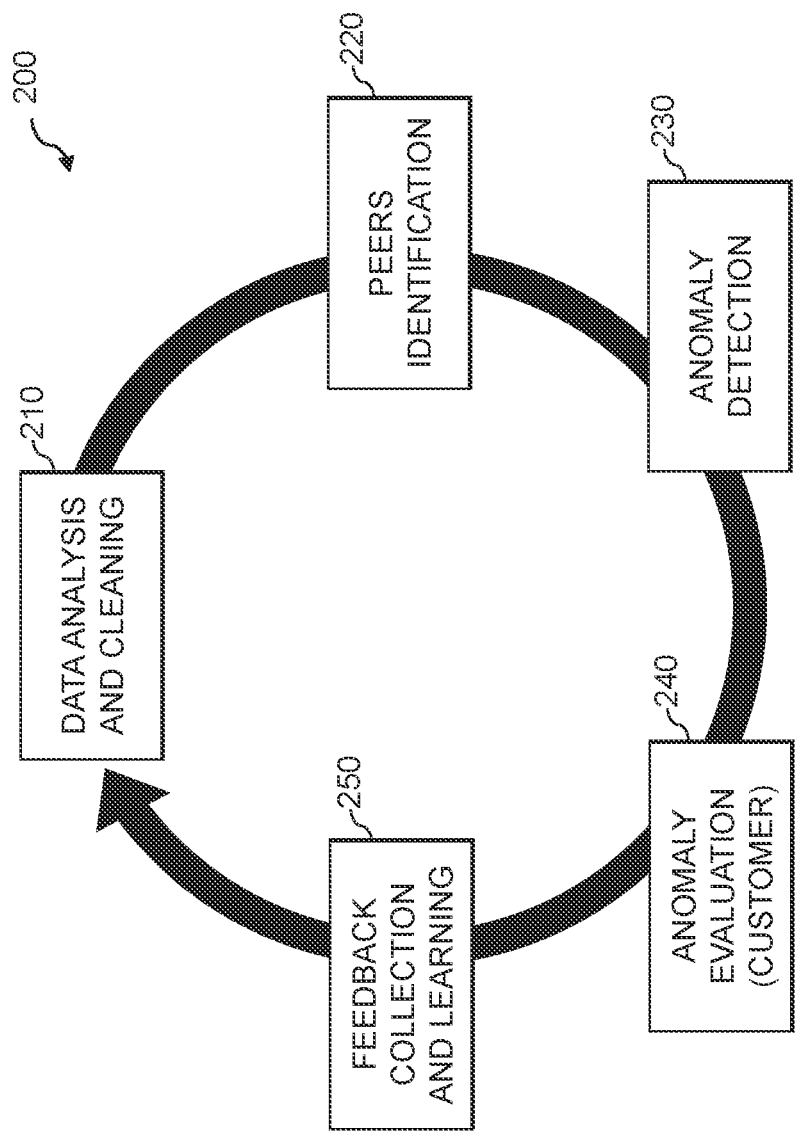
FIGS. 2 and 3 are flow charts illustrating user application entitlement evaluation processes, according to some embodiments.

FIG. 2 is a flow chart illustrating a user application entitlement evaluation process 200, according to some embodiments. As shown in FIG. 2, the exemplary user application entitlement evaluation process 200 initially performs a data analysis and cleaning during step 210 on the enterprise entitlement data 110 and enterprise reference data 150. For example, the exemplary information content rules of FIG. 6 can be applied to the available attributes 160 in the enterprise reference data 150 to remove attributes that are not sufficiently informative for clustering users. In addition, detected errors in the user application entitlements 130 are optionally corrected.

Thereafter, a peers identification process is performed during step 220, using one or more of the surviving attributes 160, following the application of the information content rules, to cluster the enterprise users 120 in the particular group. The users in each cluster are considered peers in some embodiments.

An anomaly detection process is performed during step 230, for example, to identify one or more abnormal user application entitlements 180 and/or missing user application entitlements 190. The anomaly detection process may be based on a probability of an entitlement occurrence for each user application entitlement, as discussed further below in conjunction with FIG. 3, and one or more predefined thresholds.

Thereafter, the detected anomalies are evaluated during step 240, for example, by a customer. In this manner, the decision making tasks within the attestation review process are assisted with the detected anomalies as context about the user application entitlements. For example, a given user application entitlement should be identified as potentially anomalous if, among all users in a specific location or group (or another user cluster), a given employee is the only employee that has the given user application entitlement. Thus, the disclosed user application entitlement evaluation techniques are more flexible towards user needs and inputs, and the performance and reliability of the attestation process will improve.

Finally, the exemplary user application entitlement evaluation process 200 performs an optional feedback collection and learning phase during step 250, whereby the customer can provide feedback on, for example, the particular user attribute that was used for clustering (and those attributes that were removed) and/or the validity or value of the detected anomalies.

Figure 3:
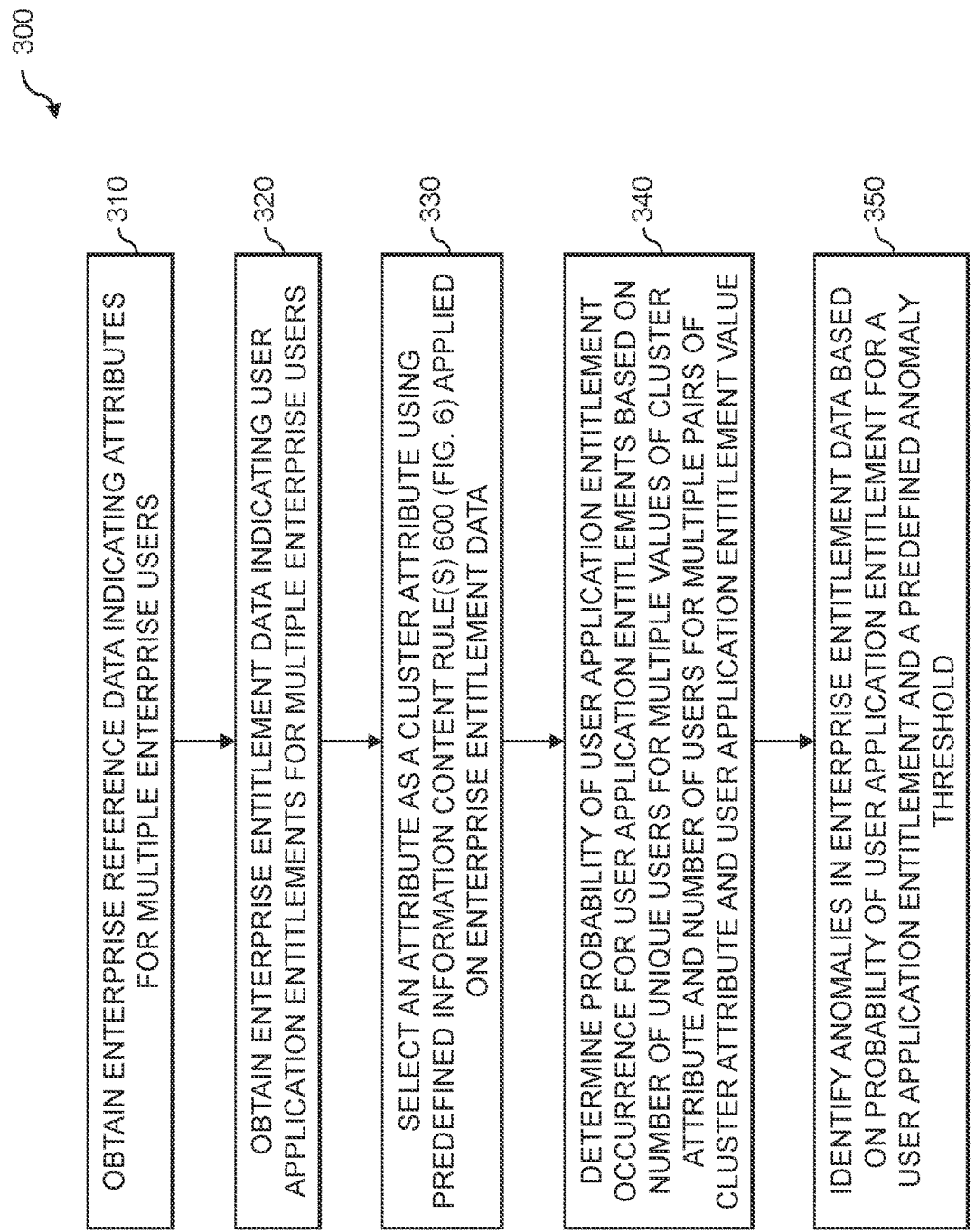

FIG. 3 is a flow chart illustrating a user application entitlement evaluation process 300, according to one embodiment. As shown in FIG. 3, the exemplary user application entitlement evaluation process 300 initially obtains the enterprise reference data 150 during step 310 indicating various attributes for multiple enterprise users.

During step 320, the exemplary user application entitlement evaluation process 300 obtains the enterprise entitlement data 110 indicating the user application entitlements for the multiple enterprise users.

An attribute is selected during step 330 as a cluster attribute using the predefined information content rule(s) 600 of FIG. 6 applied on the enterprise entitlement data 110. During step 340, the user application entitlement evaluation process 300 determines the probability of a user application entitlement occurrence for the user application entitlements in the enterprise entitlement data 110 based on the number of unique users for multiple values of the cluster attribute and the number of users for multiple pairs of the cluster attribute and user application entitlement values.

Thus, once the cluster keys (which describe the user) are identified, the number of users per key value ($N_{val_i}^U$) and per value:entitlement ($N_{val_i ent_j}^U$) are calculated. For example, if the key is a location-city, then the number of unique users in each city (value) and the number of users per each pair of city:entitlement_A are calculated. To obtain the probability of an entitlement occurrence, calculate the following:

$$P_{val_i ent_j}^U = \frac{N_{val_i ent_j}^U}{N_{val_i}^U}.$$

Finally, during step 350, the user application entitlement evaluation process 300 identifies anomalies in the enterprise entitlement data 110 based on the probability of user application entitlement for a given user application entitlement and a predefined anomaly threshold. A given user application entitlement will thus be considered anomalous in some embodiments if the probability of an entitlement occurrence is less than a configurable value, such as 1%.

Following execution of the exemplary user application entitlement evaluation process 300, a notification can be sent to the manager performing the attestation with a list of enterprise users 120 and user application entitlements to review, along with a flag for those user application entitlements that were found to be anomalous with an explanation of the reason why each user application entitlement was found to be anomalous.

Figure 4:
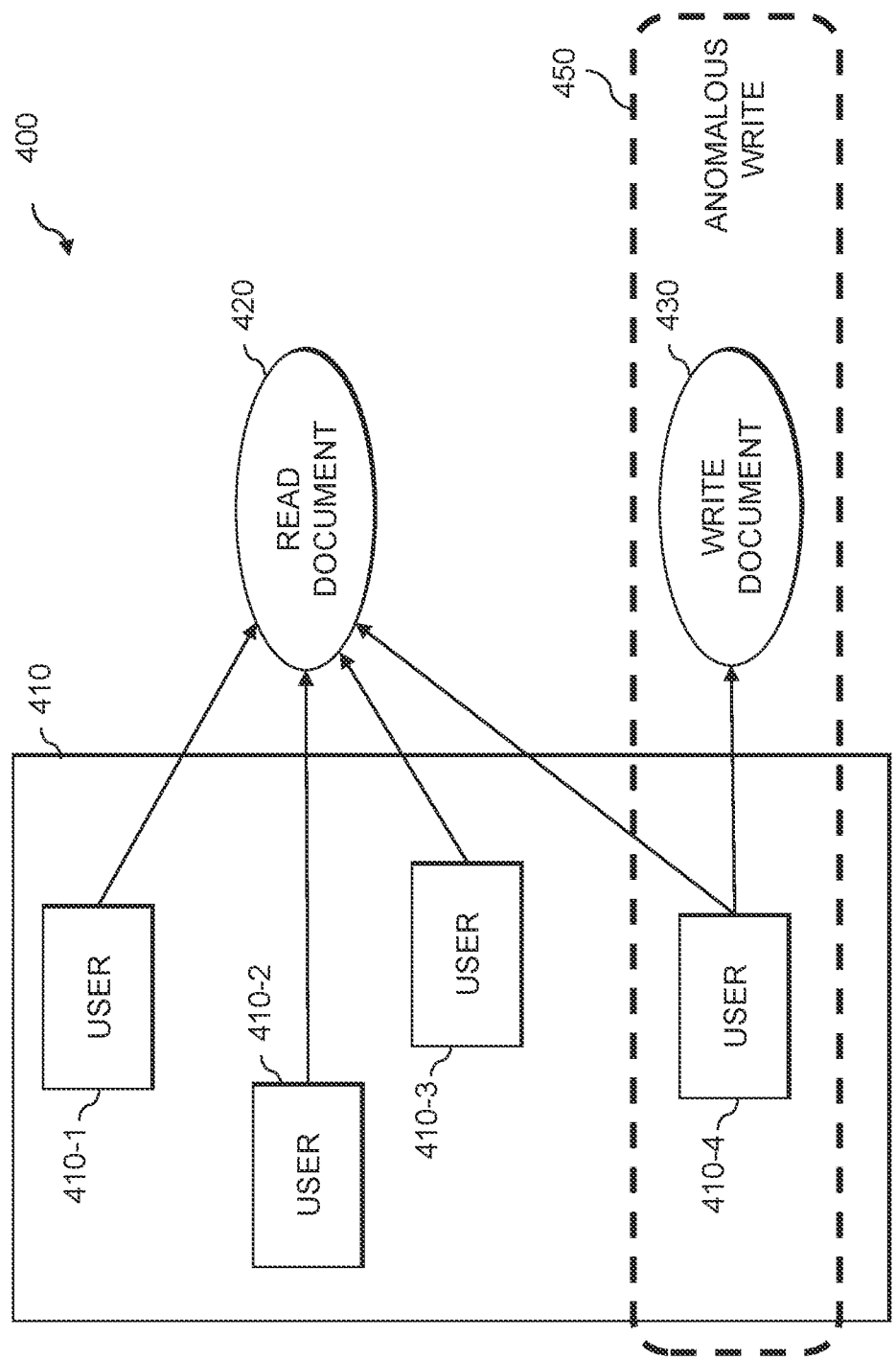
FIG. 4 illustrates an exemplary identification of abnormal user application entitlements granted to a user that is absent for other peers of the user, according to an embodiment of the disclosure.

FIG. 4 illustrates an exemplary identification 400 of abnormal user application entitlements granted to a user that is absent for other peers of the user, according to an embodiment of the disclosure. As shown in FIG. 4, for a particular cluster of users 410, comprises of exemplary users 410-1 through 410-4, all of the users have the entitlement or authorization to read a particular document 420. Only the user 410-4, however, has the entitlement or authorization to write to a particular document 430. As noted above, the user application entitlement evaluation process 300 identifies anomalies in the enterprise entitlement data 110 based on the probability of user application entitlement for a given user application entitlement and a predefined anomaly threshold. Since the user 410-4 is the only user in the group 410 that is authorized to write to the particular document 430, this user application entitlement is flagged during the identification 400 for manager review as a potential anomalous write 450.

Figure 5:
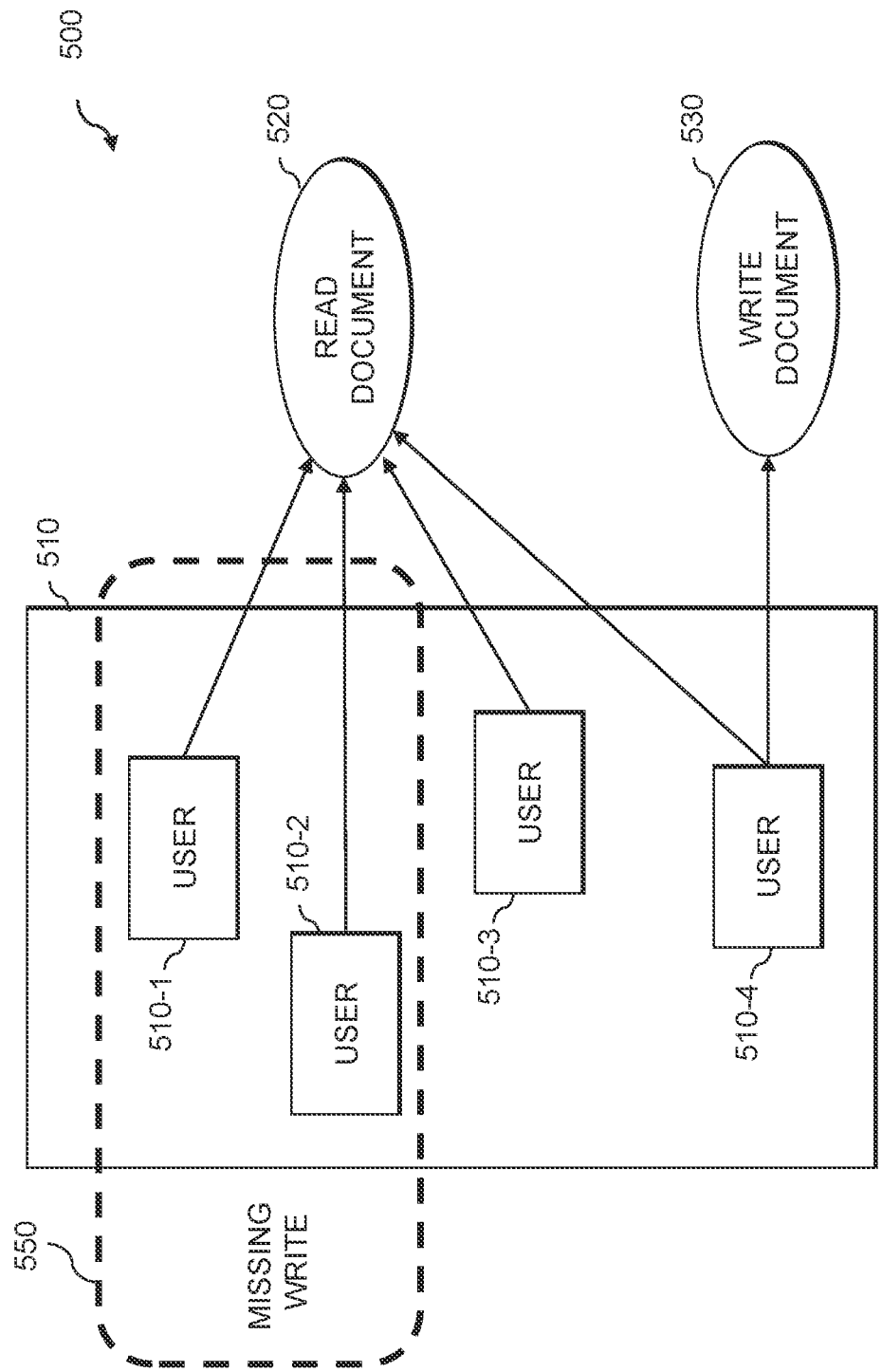
FIG. 5 illustrates an exemplary identification of missing user application entitlements that should be granted to a user to reduce credential sharing, according to one embodiment.

FIG. 5 illustrates an exemplary identification 500 of missing user application entitlements that should be granted to a user to reduce credential sharing, according to one embodiment. In the example of FIG. 5, an exemplary cluster of users 510 comprises users 510-1 through 510-4. The users 510-1 through 510-4 all have the entitlement or authorization to read a particular document 520. The users 510-3 and 510-4, however, also have the entitlement or authorization to write to a particular document 530. The embodiment of FIG. 5 recognizes that the users 510-1 and 510-2 should also be entitled to write to the particular document 530, based on the probability of user application entitlement for the user application entitlement (and may obtain credentials from another authorized user if they don't have their own credentials). Thus, the entitlement or authorization to write to the particular document 530 is flagged during the identification 500 for manager review as a potential missing write 550.

FIG. 6 illustrates an exemplary set of information content rules 600 used by the user application entitlement evaluation process of FIG. 3 to select user attributes to use as cluster attributes for the attestation analysis, according to some embodiments. As shown in FIG. 6, the exemplary information content rules 600 employ an entropy test 610, a unique values test 620, a distribution test 630, and/or a cross correlation test 640, each discussed further below.

Generally, the exemplary information content rules 600 perform attribute filtering to avoid clustering users using undesirable attributes, such as gender (e.g., those attributes that fail one of the exemplary information content rules 600). In some embodiments, one or more of the exemplary information content rules 600 count the number of unique values per attribute, and prune the attributes, for example, having a low number of values or a high number of unique values. The gender is pruned because it typically only has two values. Likewise, the User_ID attribute is pruned because it is unique for all rows in a user table.

In a number of exemplary implementations, the enterprise entitlement data 110 (e.g., the data about the user application entitlements of each user) is collected from various systems and stored, for example, in an Identity and Access Management (IAM) database. The following issues have been observed with the collection:
partial information—the data is collected on a subset of users or contains a subset of attribute values;
low cardinality—an attribute might comprise only a few values (one or two), such as gender;
missing values—many null values in the user attribute; and
multiplication of the same key—different systems store the user location as an attribute therefore in the IAM database, multiple columns may be present representing the same attribute.

If the exemplary user application entitlement evaluation process 300 was applied on the enterprise reference data 150 with all of the original attribute columns in the data 150, the results may be noisy and may confuse the reviewing manager with an inconsistent analysis.

In one or more embodiments, the exemplary information content rules 600 are applied on the enterprise reference data 150 to automatically analyze the available data (different columns of attributes) and select the best columns to choose for the anomaly analysis.

The exemplary entropy test 610 calculates the column entropy for each column (attribute) in the enterprise reference data 150, and columns with a low entropy (e.g., below a configurable threshold, such as 0.5) are removed.

The exemplary unique values test 620 calculates the number of unique elements for each column, and columns with a low cardinality (e.g., below a configurable threshold, such as 3) are removed. In addition, on the top end, it may be desirable to eliminate attributes with a high relative cardinality. For example, if the cardinality of a given attribute is greater than 85% of the total set, then there are, by definition, very few elements in each value bucket.

The exemplary distribution test 630 calculates the percent of users in each element of a column. If the highest percent of a single element is greater than a configurable value, such as 20% and/or a predefined numerical threshold, then the column is removed. For example, in a large enterprise organization, there may be 100 people that share an attribute (but that may only account for 1% of the enterprise population). One example of such a shared attribute is First Name, which may be a bad choice to use as a clustering attribute. Thus, the highest number of a single element can optionally be required to be greater than a configurable value.

The exemplary cross correlation test 640, for each pair of columns (including those columns eliminated in the previous tests), calculates a cross correlation (e.g., using a Pearson correlation coefficient measure for the calculation). When the cross correlation is greater than a configurable value, such as 0.8, then the column containing the lower cardinality is removed.

In some embodiments, the disclosed user application entitlement evaluation techniques aim to find the substantially most informative keys (user attributes) to be used to cluster users. In this manner, the managers can make a faster and more informed decision above whether a given entitlement should be kept or removed. One or more embodiments employ a data driven key (columns/attributes) selection, where the selection can be substantially optimized in an adaptive manner based on the behavior of the organization manager. Among other benefits, the disclosed adaptive approach allows the user application entitlement evaluation system to substantially optimize the selection based on the preferences of managers (or other reviewers) and the available data.

In some embodiments, the disclosed user application entitlement evaluation techniques are flexible towards user needs and inputs, and the performance and reliability of the attestation process will improve.

One or more embodiments of the disclosure provide improved methods, apparatus and computer program products for selecting attributes to cluster users for a user application entitlement evaluation during an attestation review. The foregoing applications and associated embodiments should be considered as illustrative only, and numerous other embodiments can be configured using the techniques disclosed herein, in a wide variety of different applications.

It should also be understood that the disclosed techniques for selecting attributes to cluster users for a user application entitlement evaluation, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for selecting attributes to cluster users for a user application entitlement evaluation may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services can be offered to cloud infrastructure tenants or other system users as a Platform as a Service (PaaS) offering, although numerous alternative arrangements are possible.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a cloud-based engine for selecting attributes to cluster users for a user application entitlement evaluation, or portions thereof, are illustratively implemented for use by tenants of such a multi-tenant environment.

Cloud infrastructure as disclosed herein can include cloud-based systems such as Amazon Web Services (AWS), Google Cloud Platform (GCP) and Microsoft Azure. Virtual machines provided in such systems can be used to implement at least portions of a cloud-based data-driven attribute selection platform in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 7 and 8. These platforms may also be used to implement at least portions of other information processing systems in other embodiments.

Figure 7:
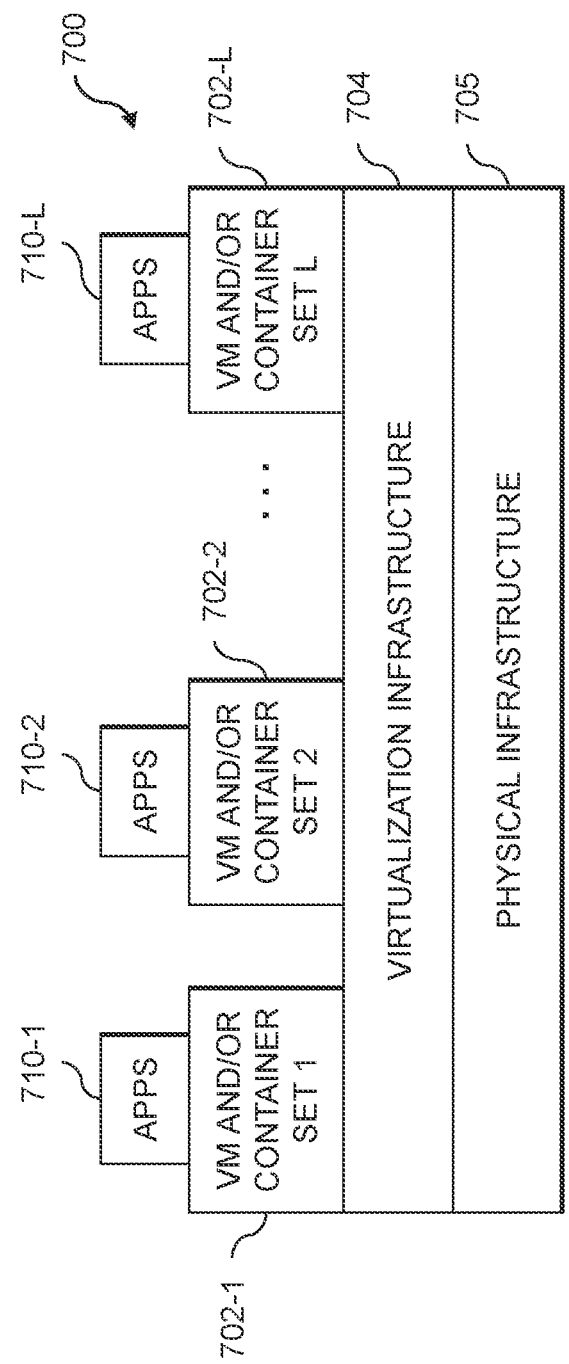
FIG. 7 illustrates an exemplary processing platform that may be used to implement at least a portion of one or more embodiments of the disclosure comprising a cloud infrastructure.

FIG. 7 shows an example processing platform comprising cloud infrastructure 700. The cloud infrastructure 700 comprises a combination of physical and virtual processing resources that may be utilized to implement at least a portion of the data-driven attribute selection system for clustering users for a user application entitlement evaluation. The cloud infrastructure 700 comprises multiple virtual machines (VMs) and/or container sets 702-1, 702-2, . . . 702-L implemented using virtualization infrastructure 704. The virtualization infrastructure 704 runs on physical infrastructure 705, and illustratively comprises one or more hypervisors and/or operating system level virtualization infrastructure. The operating system level virtualization infrastructure illustratively comprises kernel control groups of a Linux operating system or other type of operating system.

The cloud infrastructure 700 further comprises sets of applications 710-1, 710-2, . . . 710-L running on respective ones of the VMs/container sets 702-1, 702-2, . . . 702-L under the control of the virtualization infrastructure 704. The VMs/container sets 702 may comprise respective VMs, respective sets of one or more containers, or respective sets of one or more containers running in VMs.

In some implementations of the FIG. 7 embodiment, the VMs/container sets 702 comprise respective VMs implemented using virtualization infrastructure 704 that comprises at least one hypervisor. Such implementations can provide data-driven attribute selection functionality of the type described above for one or more processes running on a given one of the VMs. For example, each of the VMs can implement data-driven attribute selection control logic for clustering users for a user application entitlement evaluation for one or more processes running on that particular VM.

An example of a hypervisor platform that may be used to implement a hypervisor within the virtualization infrastructure 704 is the VMware® vSphere® which may have an associated virtual infrastructure management system such as the VMware® vCenter™. The underlying physical machines may comprise one or more distributed processing platforms that include one or more storage systems.

In other implementations of the FIG. 7 embodiment, the VMs/container sets 702 comprise respective containers implemented using virtualization infrastructure 704 that provides operating system level virtualization functionality, such as support for Docker containers running on bare metal hosts, or Docker containers running on VMs. The containers are illustratively implemented using respective kernel control groups of the operating system. Such implementations can provide data-driven attribute selection functionality of the type described above for one or more processes running on different ones of the containers. For example, a container host device supporting multiple containers of one or more container sets can implement one or more instances of data-driven attribute selection control logic for use in clustering users for a user application entitlement evaluation.

As is apparent from the above, one or more of the processing modules or other components of the data-driven attribute selection system may each run on a computer, server, storage device or other processing platform element. A given such element may be viewed as an example of what is more generally referred to herein as a "processing device." The cloud infrastructure 700 shown in FIG. 7 may represent at least a portion of one processing platform. Another example of such a processing platform is processing platform 800 shown in FIG. 8.

The processing platform 800 in this embodiment comprises at least a portion of the given system and includes a plurality of processing devices, denoted 802-1, 802-2, 802-3, . . . 802-K, which communicate with one another over a network 804. The network 804 may comprise any type of network, such as a wireless area network (WAN), a local area network (LAN), a satellite network, a telephone or cable network, a cellular network, a wireless network such as WiFi or WiMAX, or various portions or combinations of these and other types of networks.

The processing device 802-1 in the processing platform 800 comprises a processor 810 coupled to a memory 812. The processor 810 may comprise a microprocessor, a microcontroller, an application specific integrated circuit (ASIC), a field programmable gate array (FPGA) or other type of processing circuitry, as well as portions or combinations of such circuitry elements, and the memory 812, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 802-1 is network interface circuitry 814, which is used to interface the processing device with the network 804 and other system components, and may comprise conventional transceivers.

The other processing devices 802 of the processing platform 800 are assumed to be configured in a manner similar to that shown for processing device 802-1 in the figure.

Again, the particular processing platform 800 shown in the figure is presented by way of example only, and the given system may include additional or alternative processing platforms, as well as numerous distinct processing platforms in any combination, with each such platform comprising one or more computers, storage devices or other processing devices.

Figure 8:
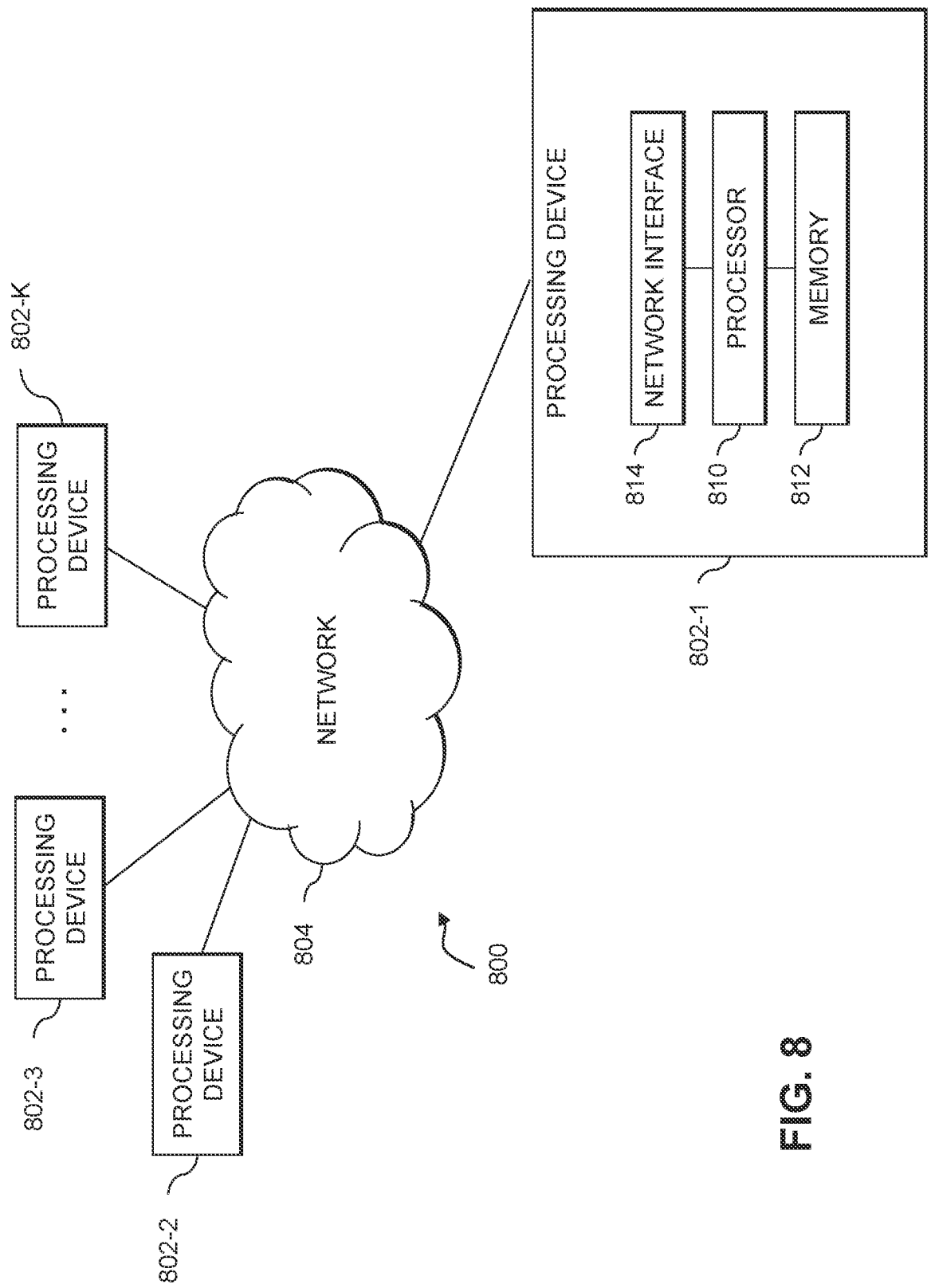
FIG. 8 illustrates another exemplary processing platform that may be used to implement at least a portion of one or more embodiments of the disclosure.

Multiple elements of an information processing system may be collectively implemented on a common processing platform of the type shown in FIG. 7 or 8, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
obtaining enterprise reference data indicating a plurality of attributes for a plurality of enterprise users;
obtaining enterprise entitlement data indicating one or more user application entitlements for the plurality of enterprise users;
selecting, using at least one processing device, at least one of the plurality of attributes as a cluster attribute, wherein said selecting comprises filtering the plurality of attributes using at least two predefined information content rules applied on the enterprise entitlement data, wherein the at least two predefined information content rules comprise: a cross correlation test that determines a cross correlation for a pair of attributes and removes a given attribute, from the plurality of attributes, having a lower cardinality from the pair of attributes when the cross correlation for the pair of attributes is above a predefined correlation threshold, and a unique values test that removes a given attribute, from the plurality of attributes, having a relative cardinality value above a predefined threshold;
clustering the plurality of enterprise users into a plurality of clusters, wherein each cluster corresponds to a different value of the cluster attribute;
determining, using the at least one processing device, a probability of a user application entitlement for the one or more user application entitlements based on (i) a number of the plurality of enterprise users in each of the plurality of clusters and (ii) a number of the plurality of enterprise users for a plurality of pairs, each pair corresponding to a given one of the clusters and a value of the one or more user application entitlements;
identifying, using the at least one processing device, one or more anomalies in the enterprise entitlement data based on the probability of the user application entitlement for at least one user application entitlement and at least one predefined anomaly threshold; and
triggering, for at least one of the identified one or more anomalies, at least one of: (i) an automated alert and (ii) an automated response describing a context of the at least one identified anomaly.

2. The method of claim 1, wherein the at least two predefined information content rules comprise an entropy test that removes a given attribute, from the plurality of attributes, below a predefined entropy value.

3. The method of claim 1, wherein the unique values test comprises removing a given attribute, from the plurality of attributes, that is below a predefined cardinality value.

4. The method of claim 1, wherein the at least two predefined information content rules comprise a distribution test that removes a given attribute, from the plurality of attributes, having one or more of a percent of users in each element of the given attribute above a predefined value and having a number of users in each element of the given attribute below a predefined value.

5. The method of claim 1, wherein the probability for a given user application entitlement is the number of users for each pair of the clusters and the given user application entitlement divided by the number of unique users for each of the clusters.

6. The method of claim 1, further comprising the step of updating one or more of the predefined information content rules and the at least one predefined anomaly threshold based on user feedback.

7. The method of claim 1, wherein the one or more anomalies in the enterprise entitlement data comprise one or more of an abnormal user application entitlement that is improperly present for at least one user within a same one of the plurality of the clusters that is absent for other peers in the same one of the plurality clusters and a missing user application entitlement that is present for other peers in the same one of the plurality of the clusters and should be granted to another user of the same one of the plurality clusters.

8. A system, comprising:
a memory; and
at least one processor, coupled to the memory, operative to implement the following steps:
obtaining enterprise reference data indicating a plurality of attributes for a plurality of enterprise users;
obtaining enterprise entitlement data indicating one or more user application entitlements for the plurality of enterprise users;
selecting at least one of the plurality of attributes as a cluster attribute, wherein said selecting comprises filtering the plurality of attributes using at least two predefined information content rules applied on the enterprise entitlement data, wherein the at least two predefined information content rules comprise: a cross correlation test that determines a cross correlation for a pair of attributes and removes a given attribute, from the plurality of attributes, having a lower cardinality from the pair of attributes when the cross correlation for the pair of attributes is above a predefined correlation threshold, and a unique values test that removes a given attribute, from the plurality of attributes, having a relative cardinality value above a predefined threshold;
clustering the plurality of enterprise users into a plurality of clusters, wherein each cluster corresponds to a different value of the cluster attribute;
determining a probability of a user application entitlement for the one or more user application entitlements based on (i) a number of the plurality of enterprise users in each of the plurality of clusters and (ii) a number of the plurality of enterprise users for a plurality of pairs, each pair corresponding to a given one of the clusters and a value of the one or more user application entitlements;
identifying one or more anomalies in the enterprise entitlement data based on the probability of the user application entitlement for at least one user application entitlement and at least one predefined anomaly threshold; and
triggering, for at least one of the identified one or more anomalies, at least one of: (i) an automated alert and (ii) an automated response describing a context of the at least one identified anomaly.

9. The system of claim 8, wherein the probability for a given user application entitlement is the number of users for each pair of the clusters and the given user application entitlement divided by the number of unique users for each of the clusters.

10. The system of claim 8, wherein the at least two predefined information content rules comprise an entropy test that removes a given attribute, from the plurality of attributes, below a predefined entropy value.

11. The system of claim 8, wherein the unique values test comprises removing a given attribute, from the plurality of attributes, that is below a predefined cardinality value.

12. The system of claim 8, wherein the at least two predefined information content rules comprise a distribution test that removes a given attribute, from the plurality of attributes, having one or more of a percent of users in each element of the given attribute above a predefined value and having a number of users in each element of the given attribute below a predefined value.

13. The system of claim 8, wherein the one or more anomalies in the enterprise entitlement data comprise one or more of an abnormal user application entitlement that is improperly present for at least one user within a same one of the plurality of the clusters that is absent for other peers in the same one of the plurality clusters and a missing user application entitlement that is present for other peers in the same one of the plurality of the clusters and should be granted to another user of the same one of the plurality clusters.

14. The system of claim 8, wherein the at least one processor is further operative to implement the following step:
    updating one or more of the predefined information content rules and the at least one predefined anomaly threshold based on user feedback.

15. A computer program product, comprising a non-transitory machine-readable storage medium having encoded therein executable code of one or more software programs, wherein the one or more software programs when executed by at least one processing device perform the following steps:
    obtaining enterprise reference data indicating a plurality of attributes for a plurality of enterprise users;
    obtaining enterprise entitlement data indicating one or more user application entitlements for the plurality of enterprise users;
    selecting at least one of the plurality of attributes as a cluster attribute, wherein said selecting comprises filtering the plurality of attributes using at least two predefined information content rules applied on the enterprise entitlement data, wherein the at least two predefined information content rules comprise: a cross correlation test that determines a cross correlation for a pair of attributes and removes a given attribute, from the plurality of attributes, having a lower cardinality from the pair of attributes when the cross correlation for the pair of attributes is above a predefined correlation threshold, and a unique values test that removes a given attribute, from the plurality of attributes, having a relative cardinality value above a predefined threshold;
    clustering the plurality of enterprise users into a plurality of clusters, wherein each cluster corresponds to a different value of the cluster attribute;
    determining a probability of a user application entitlement for the one or more user application entitlements based on (i) a number of the plurality of enterprise users in each of the plurality of clusters and (ii) a number of the plurality of enterprise users for a plurality of pairs, each pair corresponding to a given one of the clusters and a value of the one or more user application entitlements;
    identifying one or more anomalies in the enterprise entitlement data based on the probability of the user application entitlement for at least one user application entitlement and at least one predefined anomaly threshold; and
    triggering, for at least one of the identified one or more anomalies, at least one of: (i) an automated alert and (ii) an automated response describing a context of the at least one identified anomaly.

16. The computer program product of claim 15, wherein the at least two predefined information content rules comprise an entropy test that removes a given attribute, from the plurality of attributes, below a predefined entropy value.

17. The computer program product of claim 15, wherein the unique values test comprises removing a given attribute, from the plurality of attributes, that is below a predefined cardinality value.

18. The computer program product of claim 15, wherein the at least two predefined information content rules comprise a distribution test that removes a given attribute, from the plurality of attributes, having one or more of a percent of users in each element of the given attribute above a predefined value and having a number of users in each element of the given attribute below a predefined value.

19. The computer program product of claim 15, wherein the one or more anomalies in the enterprise entitlement data comprise one or more of an abnormal user application entitlement that is improperly present for at least one user within a same one of the plurality of the clusters that is absent for other peers in the same one of the plurality clusters and a missing user application entitlement that is present for other peers in the same one of the plurality of the clusters and should be granted to another user of the same one of the plurality clusters.

20. The computer program product of claim 15, wherein the probability for a given user application entitlement is the number of users for each pair of the clusters and the given user application entitlement divided by the number of unique users for each of the clusters.

* * * * *